United States Patent
Kutlucinar

[19]

[11] Patent Number: 6,116,762
[45] Date of Patent: Sep. 12, 2000

[54] HUBCAP WITH DECORATIVE LIGHTING

[75] Inventor: Iskender V. Kutlucinar, Kensington, Md.

[73] Assignee: FHK, Inc., Kensington, Md.

[21] Appl. No.: 09/033,935

[22] Filed: Mar. 2, 1998

[51] Int. Cl.[7] .................................................. B60Q 1/00
[52] U.S. Cl. ........................ 362/500; 362/545; 362/226
[58] Field of Search .................... 362/500, 545, 362/800, 802, 226; 429/96, 100, 163

[56] References Cited

U.S. PATENT DOCUMENTS

| | | |
|---|---|---|
| 2,708,712 | 10/1950 | Jamieson . |
| 3,340,389 | 2/1965 | Senseman . |
| 3,935,669 | 2/1976 | Potrzuski et al. . |
| 3,944,803 | 3/1976 | Chao . |
| 3,987,409 | 10/1976 | Freeman . |
| 4,135,229 | 1/1979 | Modurkay . |
| 4,161,018 | 7/1979 | Briggs et al. . |
| 4,164,008 | 8/1979 | Miller et al. . |
| 4,191,988 | 3/1980 | Kumakura . |
| 4,225,848 | 9/1980 | Roberts . |
| 4,289,323 | 9/1981 | Roberts . |
| 4,298,910 | 11/1981 | Price . |
| 4,308,572 | 12/1981 | Davidson et al. . |
| 4,363,502 | 12/1982 | Bakerman . |
| 4,367,515 | 1/1983 | Beard . |
| 4,381,537 | 4/1983 | Hinrichs . |
| 4,383,244 | 5/1983 | Knauff . |
| 4,430,692 | 2/1984 | Papadakis . |
| 4,562,516 | 12/1985 | Chastain . |
| 4,725,928 | 2/1988 | Strepek . |
| 4,775,919 | 10/1988 | Pearsall et al. . |
| 4,782,431 | 11/1988 | Park . |
| 5,016,144 | 5/1991 | DiMaggio . |
| 5,128,840 | 7/1992 | Seki et al. . |
| 5,283,547 | 2/1994 | Leon . |
| 5,294,188 | 3/1994 | Vancil, Jr. . |
| 5,497,302 | 3/1996 | O'Donnell . |
| 5,584,562 | 12/1996 | Geran . |
| 5,634,707 | 6/1997 | Bailey, Jr. . |
| 5,653,523 | 8/1997 | Roberts . |
| 5,683,164 | 11/1997 | Chien . |

*Primary Examiner*—Sandra O'Shea
*Assistant Examiner*—Bertrand Zeade
*Attorney, Agent, or Firm*—Staas & Halsey LLP

[57] ABSTRACT

A hubcap assembly having a hubcap for installation onto a wheel. The hubcap having an exterior surface provided with a central recess having first and second grooves on opposite sides of the central recess. The hubcap is also provided with openings with lights positioned thereunder. The plurality of lights are electrically connected to the first and second grooves. A battery pack engagable with and removable from the central recess is provided for supplying power to the plurality of lights. The battery pack has a housing provided with a first and second opening on opposite sides of the housing. First and second open cavities are formed on a top surface of the housing. A battery is secured inside of the housing. First and second electrodes are electrically connected to the battery. The first electrode extending through the first opening and the second electrode extending through the second opening. The first and second electrodes are biased so as to retractably extend from the housing to engage the first and second grooves, respectively, in the central recess in the hubcap to provide power to said plurality of lights. A first handle is slidably positioned in the first cavity. The first electrode extends through and cooperates with the first handle such that the first handle is biased toward an outside edge of the housing. The second handle is slidably positioned in the second cavity. The second electrode extends through and cooperates with the second handle such that the second handle is biased toward an outside edge of the housing.

20 Claims, 8 Drawing Sheets

HUBCAP WITH DECORATIVE LIGHTING

BACKGROUND OF THE INVENTION

The present invention relates to a hubcap having decorative lighting and to a battery pack therefor. Specifically, the present invention sets forth a new and useful combination of a hubcap having decorative lighting, and a battery pack providing power for the decorative lighting.

Consumers like to own distinctive and individualized automobiles. This can be verified by entering any auto parts store. A quick survey of the inventory will confirm that almost everything on an automobile can be customized or improved. In recent years, one popular improvement has been to add decorative lighting to the outside of the automobile. Lighted license plate covers have proved especially popular. Also popular are lights which attach underneath the body and light the road surface.

There have been many attempts at providing decorative lightning for wheels or hubcaps attached thereto. Beyond the basic function of providing lightning in conjunction with the wheel, most of the recent attempts have concentrated on using the rotation of the wheel to provide power to the lighting. To date, none of the previous attempts has achieved acceptance by the American public.

The present inventor believes that one of the major reasons that lighted wheels have not achieved acceptance is because of their complexity, and more specifically due to complicated power systems. Simply put, the existing power systems for lighted hubcaps are not easily installed or repaired by the average American driver.

For example, in lighting systems which derive power from the main battery of an automobile such as U.S. Pat. No. 3,340,389 to Senseman, in the event of a system fault, it is highly unlikely that the system is repairable by the average American driver. The wiring is complex, and even if each hubcap or wheel has its own generator as in U.S. Pat. No. 4,725,928 to Strepak or U.S. Pat. No. 4,728,431 to Park, most drivers cannot easily repair such complex mechanisms. In magneto-electrical power systems deriving power from the rotation of the wheel such as U.S. Pat. No. 4,775,919 to Pearsall et al., the power system is even more complex. Known hubcaps with decorative lighting typically require a mechanic with specialized training to perform installation and repair. Accordingly, most drivers do not find the installation of lighted hubcaps to be worth their hard earned money.

Another problem with existing lighted hubcaps such as Senseman and U.S. Pat. No. 4,430,692 to Papadakis is that they're integrated with the automobile upon which they're placed and require modifications to the automobile (which may void the warranty on new cars). For example, hubcaps requiring power from the main battery of the car require that the car's electrical system modified so as to supply power across the axle to the wheel. Many system that rely upon the rotation of the wheel to provide power also require substantial modifications to the wheel and/or axle to work.

The present inventors have recognized a need for a convenient easily removable power supply for lighted hubcaps. Such a power supply, should not be technically advanced or complicated, so as to allow an average driver to install, maintain and repair the lighted hubcaps.

SUMMARY OF THE INVENTION

Accordingly, it is an object of the present invention to provide a lighted hubcap assembly installable by the average driver.

It is an additional object of the present invention to provide a lighted hubcap assembly maintainable by the average driver.

It is also an object of the present invention to provide a secure removable battery pack for use with rotating members.

It is a further object of the present invention to provide a secure removable battery pack for use with lighted hubcaps.

It is a yet further object of the present invention to provide a kit for adding decorative lighting to wheels without requiring modification to the wheels or vehicle.

Additional objects and advantages of the invention will be set forth in part in the description which follows, and, in part, will be obvious from the description, or may be learned by practice of the invention.

Objects of the present invention are achieved in a battery pack having a housing provided with a first and second opening on opposite sides of the housing, a battery secured inside of the housing, and a first and second electrode connected to the battery, the first electrode extending through the first opening and the second electrode extending through the second opening, the first and second electrodes being biased so as to retractably extend from the housing.

Objects of the present invention are also achieved in a hubcap assembly having a hubcap for installation onto a wheel, the hubcap having an exterior surface provided with a central recess and a plurality of openings, a plurality of lights positioned under the plurality of openings, and a battery pack engagable with and removable from the central recess for supplying power to the plurality of lights, the battery pack being removable while said hubcap is installed on the wheel.

Objects of the present invention are also achieved in a kit for adding decorative lighting to an automobile, the kit having at least one hubcap, preferably four hubcaps, each hubcap having an exterior surface provided with a plurality of openings, a plurality of lights, at least one light being positioned under each of said plurality of openings on each hubcap, at least one of the hubcaps being provided with a central recess having a first and second groove on opposite sides thereof and a battery pack engagable with and removable from the central recess for supplying power to the plurality of lights, the battery pack being removable while the at least one hubcap is installed on the wheel.

Objects of the present invention are also achieved in a hubcap assembly having a hubcap for installation onto a wheel, the hubcap having an exterior surface provided with a central recess provided with a first and second grooves on opposite sides of the central recess, the hubcap being provided with a plurality of openings, a plurality of lights positioned under the plurality of openings, a battery pack engagable with and removable from the central recess for supplying power to the plurality of lights, the battery pack having a housing provided with a first and second opening on opposite sides of the housing and first and second open cavities on a top surface thereof, a battery secured inside of the housing, a first and second electrode connected to the battery, the first electrode extending through the first opening and the second electrode extending through the second opening, the first and second electrodes being biased so as to retractably extend from the housing and engage the first and second grooves, respectively, in the central recess in the hubcap, a first handle slidably positioned in the first cavity, the first electrode extending through and cooperating with the first electrode such that the first handle is biased toward an outside edge of the housing, and a second handle slidably positioned in the second cavity, the second electrode extending through and cooperating with the second handle such that the second handle is biased toward an outside edge of the housing.

Objects of the present invention may also be achieved in a lighted wheel having an exterior surface provided with a central recess and a plurality of openings, a plurality of lights positioned under said plurality of openings, a battery pack engagable with and removable from the central recess for supplying power to the plurality of lights, the battery pack being removable from the exterior surface.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
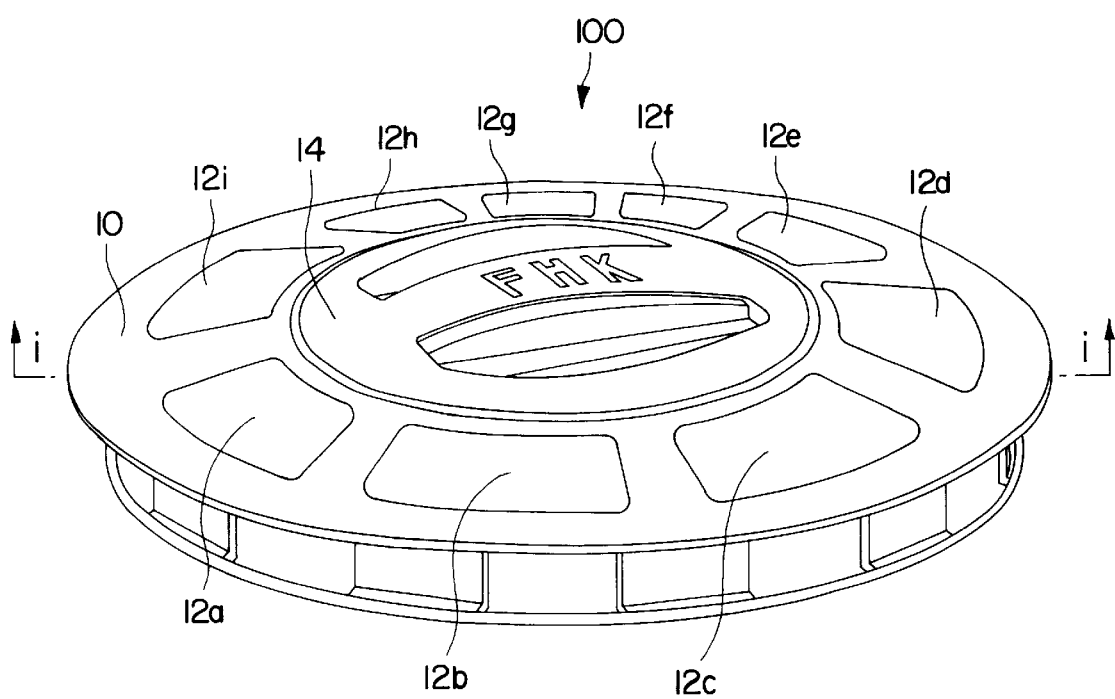
FIG. 1 is an isometric view of a lighted hubcap assembly in accordance with the preferred embodiment of the present invention.

Reference will now be made in detail to the present preferred embodiment of the present invention, examples of which are illustrated in the accompanying drawings, wherein like reference numerals refer to like elements throughout.

FIG. 1 is an isometric view of a lighted hubcap assembly 100 in accordance with the preferred embodiment of the present invention. The lighted hubcap assembly 100 generally comprises a hubcap 10 which mates with a wheel (not shown) and a battery pack 14. The battery pack 14 is removable and preferably rechargeable as described hereinafter. The hubcap 10 is provided with a plurality of openings or windows 12a–12i. The openings 12a–12i may be provided with light diluting plastic covers, which also may be of a variety of colors. As will be shown later, LEDs are placed behind the openings 12a–12i to provide decorative lighting for the hubcap 10.

One of ordinary skill in the art will understand the dimensions of the hubcap 10 vary according to the application upon which it is being used. For example, in the case of automobiles, the hubcap 10 would be sized so as to fit popular wheel applications, and have 15, 16, or even 17 inch diameters. Furthermore, the hubcap 10 and the battery pack 14 may be made of any suitable material such as aluminum or injection molded plastic. Of course, the hubcap assembly 100 is not limited for use in passenger automobiles but may also find application with commercial trucks, racing cars, or even toys. The invention may also be embodied directly in a wheel of an automobile or other vehicle.

One of the key features of the present invention is the use of the removable battery pack 14. By providing a battery pack 14 which can be removed while the hubcap is still engaged with the wheel, the user is easily able to fix problems in the power system of the hubcap by merely removing the battery pack, and if necessary, reinserting a new one. Details of the battery pack 14 are discussed hereinbelow.

Figure 2:
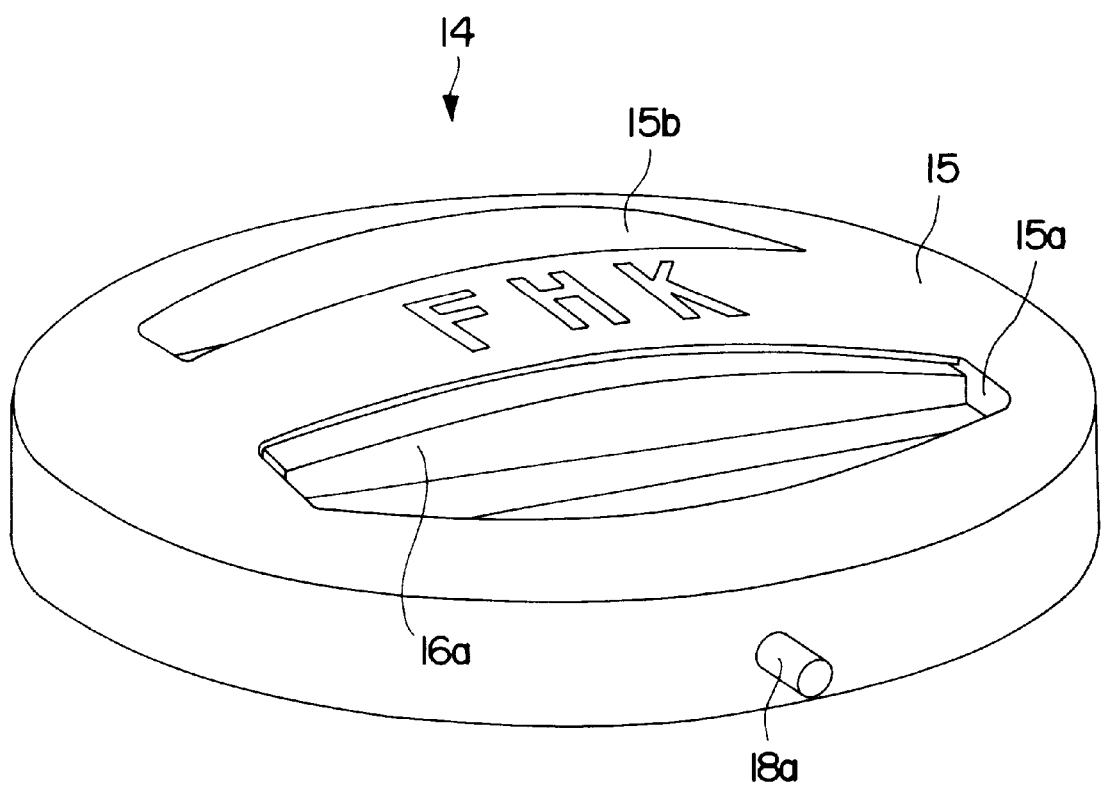
FIG. 2 is an isometric view of a battery pack for a lighted hubcap in accordance with the present invention.

FIG. 2 is an isometric view of a battery pack 14 for a lighted hubcap in accordance with the present invention. The battery pack 14 generally comprises a housing 15 for holding a rechargeable battery (not shown), a pair of locking handles (or just "handles") 16a and 16b (only the locking handle 16a is visible in this view), and a pair electrode/locking pins (or just "pins") 18a and 18b (only the electrode/locking pin 18a is visible) engaged with the locking handles 16a and 16b. The locking handles 16a and 16b are slidably retained in cavities 15a and 15b, respectively, provided in the housing 15. As will be discussed hereinafter, the locking handles 16a and 16b are engaged with the electrode/locking pins 18a and 18b to facilitate retraction of the electrode/locking pins 18a and 18b.

The locking handles 16a and 16b are biased from the center of housing 15 toward an outside edge of the housing 15 by a pair of springs (not shown). For insertion or extraction, the user merely compresses the locking handles 16a and 16b towards the center of the housing 15 and against the biasing of the springs to retract the electrode/locking pins 18a and 18b. After insertion (or extraction) the user merely releases the locking handles 16a and 16b and the electrode/locking pins 18a and 18b extend and engage with matching grooves (not shown) in the hubcap 10. The structure of the locking handles 16a and 16b and the electrode/locking pins 18a and 18b will be discussed hereinafter, it being recognized that locking handle 16a has the same structure as the locking handle 16b and that the electrode/locking pins 18a and 18b each have the same structure.

Figure 3A:
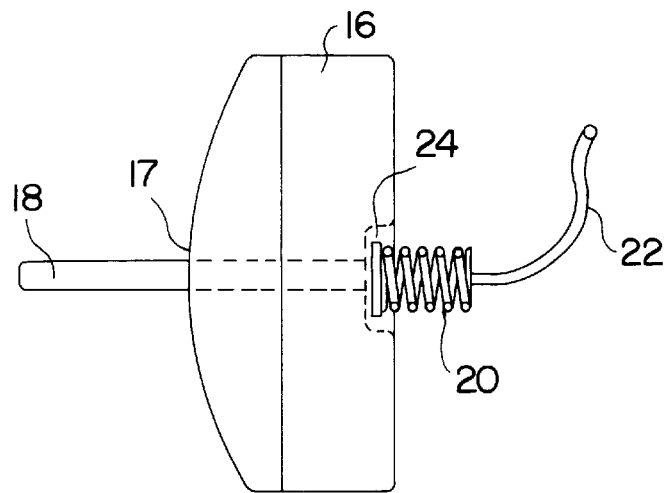
FIG. 3A is a top-down plan view of a locking handle for the battery pack.
Figure 3B:
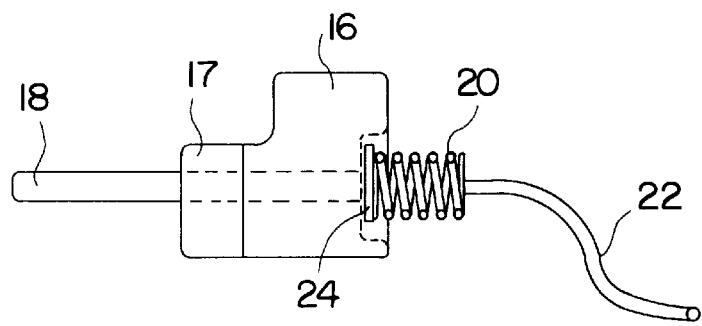
FIG. 3B is a side view of the locking handle for the battery pack.
Figure 3C:
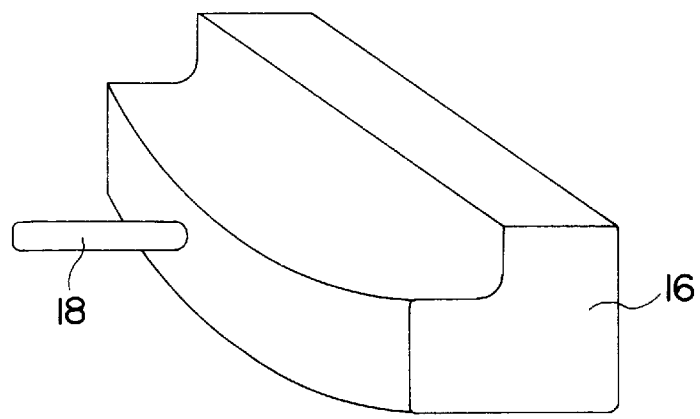
FIG. 3C is an isometric view of the locking handle for the battery pack.

FIG. 3A is a top-down plan view of a locking handle 16 for the battery pack 14. FIG. 3B is a side view of the locking handle 16 for the battery pack 14. FIG. 3C is an isometric view of the locking handle 16 for the battery pack 14. The locking handle 16 is provided with an opening 17 through which the electrode/locking pin 18 extends and retracts. A washer 24, which is electrically conductive, is provided inside the locking handle 16 and is engaged with the electrode/locking pin 18. A spring 20, also electrically conductive, biases the washer 24 against the locking handle 16. A wire 22 extends from the spring 20 and is connected to a battery (not shown). Thus, current from the battery flows through the wire 22, the spring 20, the washer 24 to the electrode/locking pin 18. As will be discussed hereinafter, the electrode/locking pin 18 engages with a lead in the hubcap 10 to illuminate lights contained in the hubcap 10.

Figure 4:
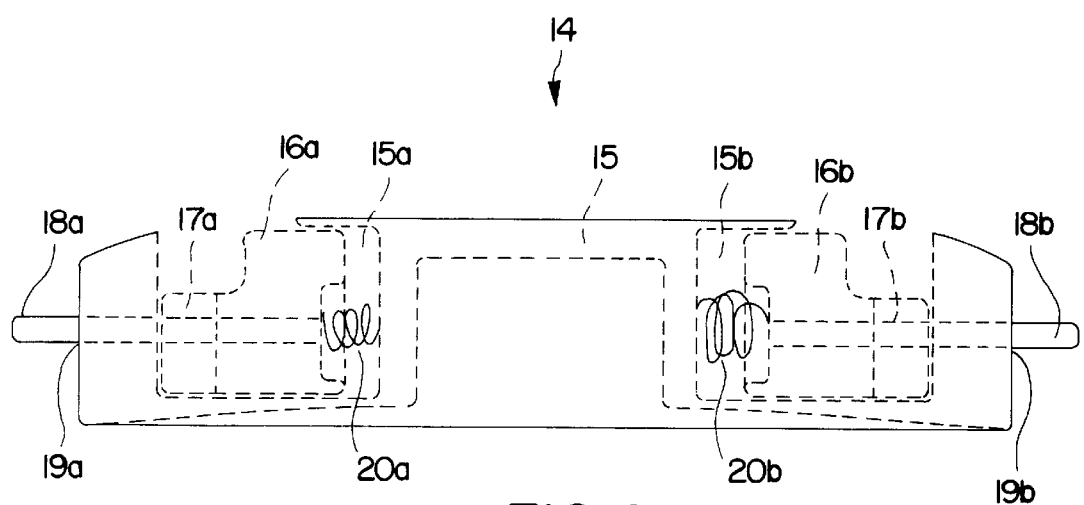
FIG. 4 is a side cut-away view of the battery pack.

FIG. 4 is a simplified side cut-away view of the battery pack 14 in accordance with the preferred embodiment of the present invention. As can be seen, the locking handles 16a and 16b can freely slide within the recess 15a and 15b provided on either side of the battery pack 14. The electrode/ locking pins 18a and 18b extend through openings 19a and 19b in the housing 15 of the battery pack 14. The springs 20a and 20b bias the locking handles 16a and 16b outward, thereby extending the electrode/locking pins 18a and 18b through the holes 19a and 19b. As will be discussed hereinbelow, the electrode/locking pins 18a and 18b mate with grooves in the side of the hubcap 10. One advantage of this configuration is that the battery pack 14 is not only secured by the engagement of the electrode/locking pins 18a and 18b with the hubcap 10 via the bias of the springs 20a and 20b, but also, while the car is in motion, centrifugal forces will tend to push the locking handles 16a and 16b outward thereby further strengthening the engagement of the electrode/locking pins 18a and 18b with the hubcap 10.

Figure 5:
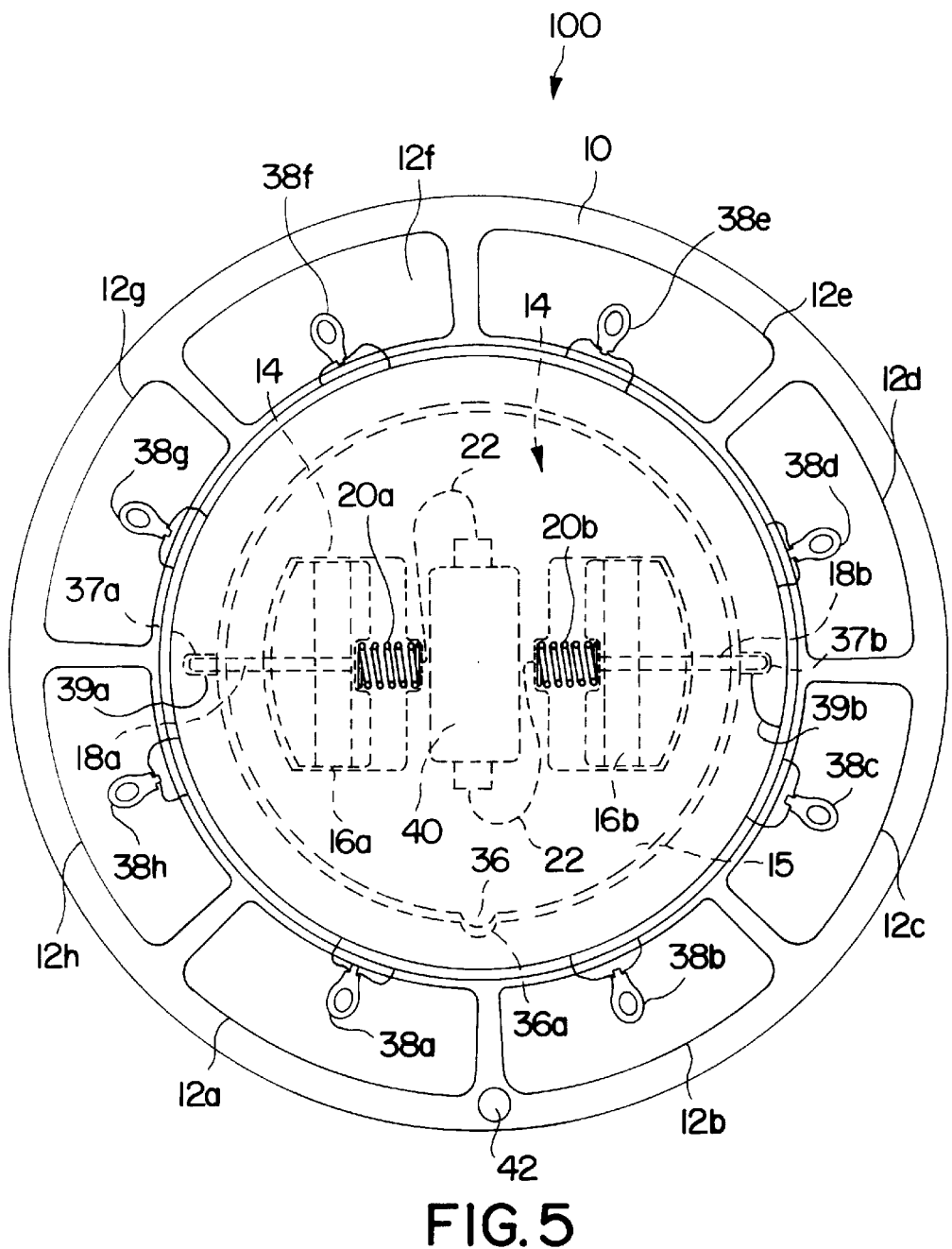
FIG. 5 is a cross-sectional diagram of the hubcap assembly shown in FIG. 1 taken along line ii.

FIG. 5 is a cross-sectional diagram of the hubcap assembly 100 taken along line i—i of FIG. 1. This view specifically shows the battery 40 within the housing 15 of the battery pack 14. As can be seen, LED lights 38a through 38h are provided in windows 12a through 12h. Please note, that while nine windows 12a through 12i are shown in FIG. 1, FIG. 5 only shows eight windows 12a through 12h, so as to emphasize that the number and placement of windows is variable and can be modified according to wheel size, power requirements, and the desired lighting effect.

As can be seen in FIG. 5, the electrode/locking pins 18a and 18b engage grooves 37a and 37b in the hubcap 10. Additionally, leads 39a and 39b contact the electrode/locking pins 18a and 18b in the grooves 37a and 37b so as to supply current to the LEDs 38a–38h.

The housing of the battery pack 14 may be provided with an alignment point 36 which mates with a matching alignment recess 36a in the hubcap 10. The alignment point 36 and alignment recess 36a serve to ensure correct rotational alignment of the battery pack 14 upon insertion to the hubcap 10. As noted hereinabove, to remove the battery pack 14, the user merely presses the locking handles 16a and 16b together so as to draw the electrode/locking pins 18a and 18b out of engagement with the grooves 37a and 37b. The user then merely pulls the battery pack 14 away from the hubcap 10. Installation of the battery pack 14 is the reverse of this procedure.

While the battery 40 may comprise a standard NiCad or alkaloid cell, it preferably comprises a rechargeable cell. Accordingly, if the hubcap assembly 100 is to be offered in kit form, a recharging station may also be provided.

Figure 6:
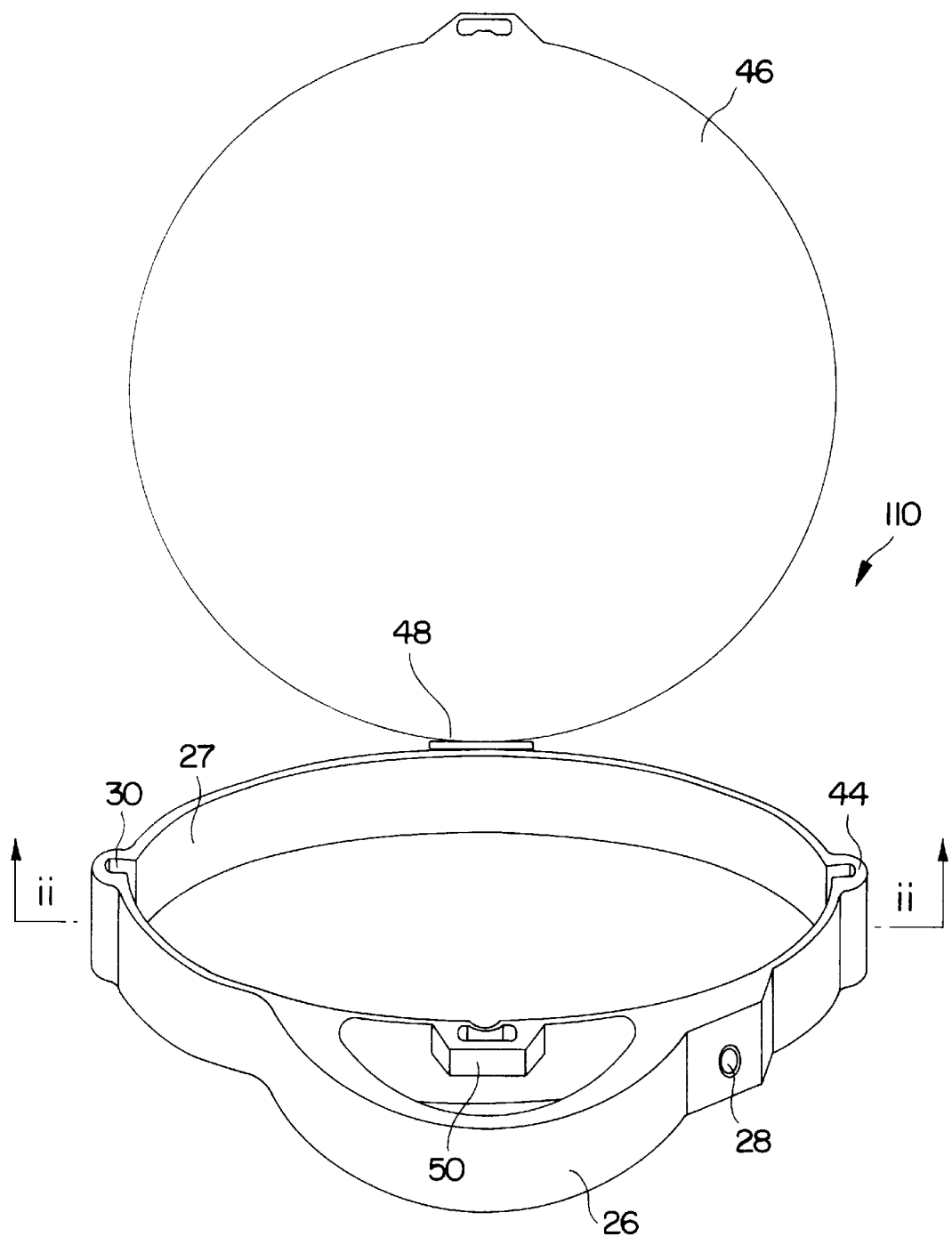
FIG. 6 is an isometric view of a battery charger for the battery pack shown in FIG. 2.

FIG. 6 is an isometric view of a charging station 110 for use with the battery pack 14. The charging station 110 generally comprises a body 27 forming a cavity for receiving the battery pack 14. A carrying handle 26 may be provided to facilitate ease of transportation. A lid 46, connected by a hinge 48, is provided to ensure safe charging operation by covering the battery pack 14 during charging. The hinge 48 can be provided with an ON/OFF switch (not shown) to provide further security during the charging operation. A locking mechanism 50 is also provided to ensure that the lid 46 does not accidentally open during charging.

Recesses 30 and 44 are provided for receiving the electrode/locking pins 18a and 18b. As shown, the recesses 30 and 44 are open on the top to allow easy insertion of the battery pack 14. However, one of ordinary skill in the art will understand that they could be closed on the top thereby securing the battery pack 14 upon insertion into the charging station 110.

A power input plug 28 is provided on the body 27 to receive power from a charging unit (not shown), which is well-known in the art. The actual circuitry for performing the charging of the battery pack 14 can either be provided in the charging station 110 or in the power supply. The ultimate power supply can either be a 12 volt car battery system or a household 120 VAC system.

Figure 7:
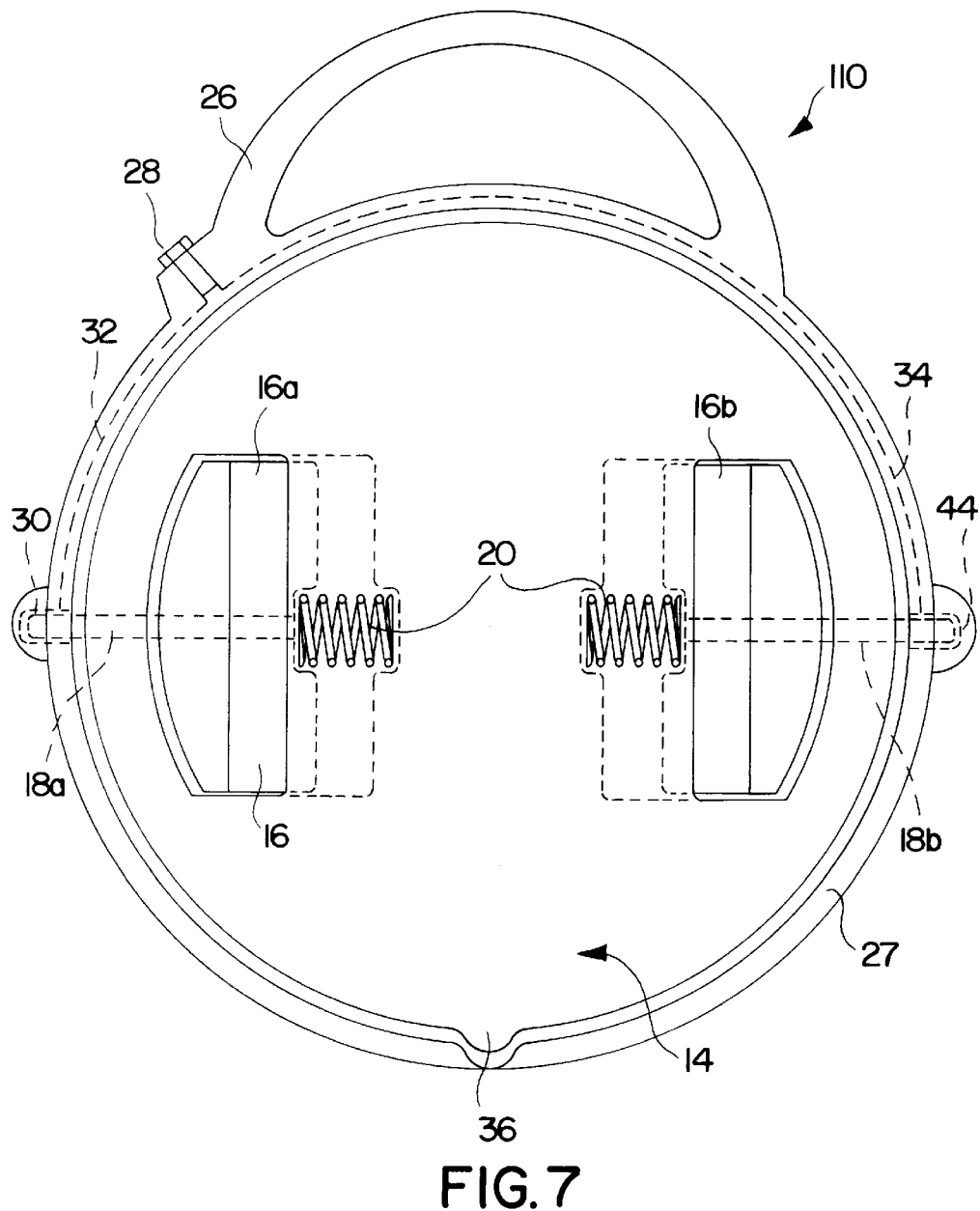
FIG. 7 is a partial cut-away view from the battery pack shown in FIG. 6 taken along ii—ii and showing the battery pack installed therein.

FIG. 7 is a partial cut-away view of the charging station 110 taken along line ii—ii in FIG. 6 with the battery pack 14 installed. In FIG. 7, the charging circuitry is provided as part of the power supply (not shown). The power input plug 28 is connected by wires 32 and 34 to the recesses 30 and 44 whereupon they contact the electrode/locking pins 18a and 18b when the battery pack 14 is inserted into the charging station 110.

Although the preferred embodiment of the hubcap assembly has been shown and described, it will be appreciated by those skilled in the art that changes may be made in the hubcap assembly without departing from the principles and spirit of the invention, the scope of which is defined in the claims and their equivalents.

Alternative embodiments may also be provided within the scope of this invention, for example, only one hubcap, out of all the hubcaps on a vehicle, may be provided with a battery pack 14. Power leads can then be provided to the other hubcaps, utilizing known apparatus and methods for example, a brush configuration. Of course, the hubcap assembly 100 is not limited for use on automobiles, but may also find application on toys, roller blades, motorcycles, bicycles, etc.

The battery pack 14 may also find application outside of the hubcap 10. For instance, it could be used on wheels with integrated lighting systems built in, i.e., in situations where hubcaps are not necessary. Additionally, the battery pack 14 is especially suited for any rotating application which requires internal power and a stable locking mechanism. Such applications might include toys, rollerblades, bicycles, or even gears on heavy machinery.

Figure 8:
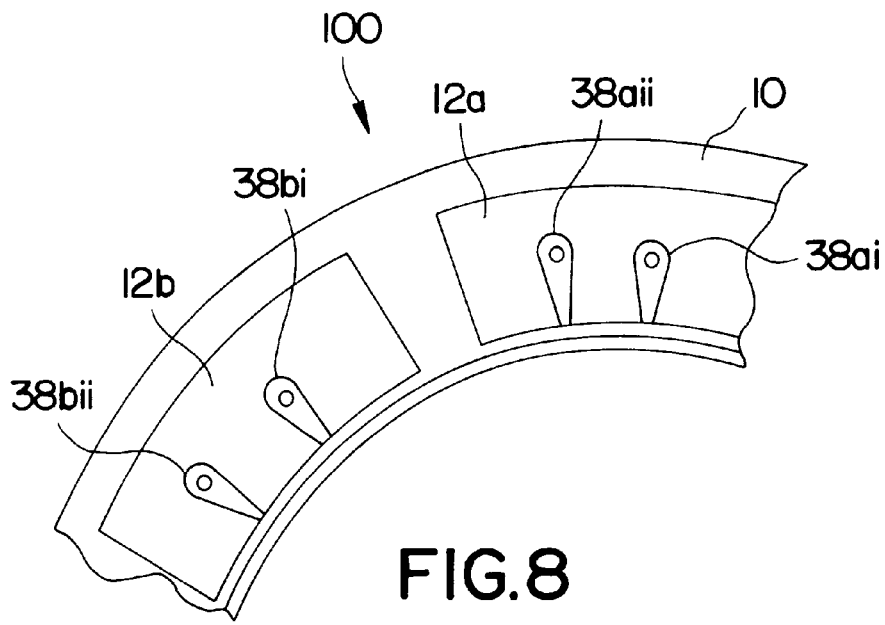
FIG. 8 is a partial view of an alternative hubcap in accordance with the present invention.
Figure 9:
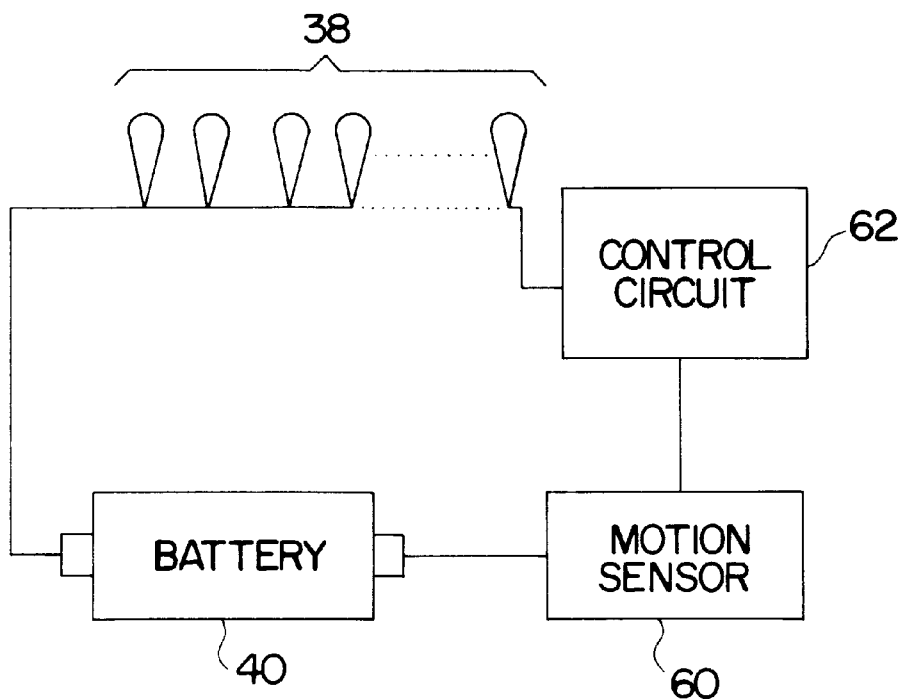
FIG. 9 is a circuit diagram of a hubcap in accordance with a preferred embodiment of the present invention.

One of ordinary skill in the art will recognize that enhancements may be made to the hubcap assembly 100. FIG. 9 is a circuit diagram showing a motion sensor 60 provided to detect motion of the hubcap 10. A control circuit 62 is also provided for changing the pattern of lighting in conjunction with wheel speed. The simplest change would be to turn LEDs ON or OFF based upon motion of the hubcap. FIG. 8 shows an additional embodiment having two sets of LEDs {38ai, 38aiii} and {38bi, 38bii} in each opening 12, each LED being a different color. LEDs 38 are lighted by the control circuit 62 based upon the speed of the vehicle. Finally, the LEDs 38 can be made to blink, based upon the speed of the wheel, so as to seemingly create a pattern or even a message.

The battery pack 14 may also be modified to provide additional utility. For example, the electrodes 18a and 18b may be placed at an angle, respective to the plane of the wheel, to increase their locking power under rotation. Additionally, while a pair of electrode/locking pins 18a and 18b have been described as necessary for completing an electrical circuit, i.e., electrode/locking pin 18a acts as a negative electrode while electrode/locking pin 18b acts as the positive electrode, one of ordinary skill in the art would realize that only one electrode/locking pin 18 is required for creating a circuit. In such an instance, the tip of the electrode/locking pin 18 is provided with the recess which is independently wired from an insulated outside of the electrode/locking pin 18. This is similar to a popular arrangement used to supply power to many consumer electronic devices, such as portable CD players, TVs and radios.

In summary, the present inventors have recognized the need for a hubcap with decorative lighting having a convenient power supply. They have described a hubcap 10 having a removable battery pack 14 which can house a rechargeable battery 40. The battery pack 14 has an innovative locking mechanisms with doubles as electrodes for supplying power to LEDs 38 in the hubcap 10. In the preferred embodiment, each wheel of an automobile is provided with a hubcap assembly 100. For passenger automobiles, the present invention may be supplied in kit form comprising four hubcap assemblies 100 and a single charging station 110. The charging station 110 may be powered by either a 12 volt car battery or standard household power output providing 120 VAC.

What is claimed is:

1. A battery pack comprising:
   a housing provided with a first and second opening on opposite sides of said housing;
   a battery secured inside of said housing; and
   first and second electrodes connected to said battery, said first electrode extending through the first opening and said second electrode extending through the second opening, said first and second electrodes being biased so as to retractably extend from said housing.

2. A battery pack, as set forth in claim 1, wherein said housing is provided with first and second open cavities on a top surface thereof and wherein the battery pack further comprises:
   a first handle slidably positioned in said first cavity, said first electrode extending through and cooperating with said first handle such that said first handle is biased toward an outside edge of said housing; and
   a second handle slidably positioned in said second cavity, said second electrode extending through and cooperating with said second handle such that said second handle is biased toward an outside edge of said housing.

3. A battery pack, as set forth in claim 1, wherein, said first and second electrodes extend from said housing angled toward the top surface of said housing.

4. A hubcap assembly comprising:
   a hubcap for installation onto a wheel, said hubcap having an exterior surface provided with a central recess and a plurality of openings;
   a plurality of lights positioned under said plurality of openings; and
   a battery pack engagable with and removable from the central recess for supplying power to said plurality of lights, said battery pack being removable while said hubcap is installed on the wheel.

5. A hubcap assembly, as set forth in claim 4, wherein the central recess on said hubcap is provided with first and second grooves on opposite sides of the central recess; and wherein the battery pack comprises:
   a housing provided with first and second openings on opposite sides of said housing;
   a battery secured inside of said housing; and
   first and second electrodes connected to said battery, said first electrode extending through the first opening and said second electrode extending through the second opening, said first and second electrodes being biased so as to retractably extend from said housing and engage the first and second grooves, respectively, in the central recess in said hubcap.

6. A hubcap assembly, as set forth in claim 5, wherein said housing is provided with first and second open cavities on a top surface thereof and wherein the battery pack further comprises:
   a first handle slidably positioned in said first cavity, said first electrode extending through and cooperating with said first handle such that said first handle is biased toward an outside edge of said housing; and
   a second handle slidably positioned in said second cavity, said second electrode extending through and cooperating with said second handle such that said second handle is biased toward an outside edge of said housing.

7. A hubcap assembly, as set forth in claim 4, wherein said plurality of lights comprise LEDs.

8. A hubcap assembly, as set forth in claim 4, wherein at least two lights are provided for each of said plurality of openings, each opening having at least two lights of different colors.

9. A hubcap assembly, as set forth in claim 8, further comprising a control circuit which illuminates one light in each opening at one time, the light being illuminated determined by a speed of rotation of said hubcap.

10. A hubcap assembly, as set forth in claim 4, further comprising a motion sensor in communication with the plurality of lights such that the plurality of lights are turned ON when the hubcap is rotating and the plurality of lights are turned OFF when the hubcap is not rotating.

11. A kit for adding decorative lighting to a vehicle, the kit comprising:
   at least one hubcap for installation onto the wheels of the vehicle, said hubcap having an exterior surface provided with a plurality of openings;
   a plurality of lights, at least one light being positioned under each of said plurality of openings on the at least one hubcap;
   wherein the at least one hubcap is provided with a central recess and a battery pack engagable with and removable from the central recess for supplying power to said plurality of lights, said battery pack being removable while said at least one hubcap is installed on the wheel.

12. A kit, as set forth in claim 11, wherein the central recess on said at least one hubcap is provided with first and second grooves on opposite sides of the central recess; and wherein the battery pack comprises:
   a housing provided with first and second openings on opposite sides of said housing;
   a battery secured inside of said housing; and
   first and second electrodes connected to said battery, said first electrode extending through the first opening and said second electrode extending through the second opening, said first and second electrodes being biased so as to retractably extend from said housing and engage the first and second grooves in the central recess in said hubcap.

13. A hubcap kit, as set forth in claim 12, wherein said housing is provided with first and second open cavities on a top surface thereof and wherein the battery pack further comprises:
   a first handle slidably positioned in said first cavity, said first electrode extending through and cooperating with said first handle such that said first handle is biased toward an outside edge of said housing; and
   a second handle slidably positioned in said second cavity, said second electrode extending through and cooperating with said second handle such that said second handle is biased toward an outside edge of said housing.

14. A hubcap kit, as set forth in claim 11, wherein said battery pack is provided with a rechargeable battery, said hubcap kit further comprising:

a charging station which receives said battery pack and performs a recharging operation thereon.

15. A hubcap kit, as set forth in claim 11, wherein each of said hubcaps is provided with central recess and a battery pack engagable with and removable from the central recess for supplying power to the lights from among said plurality of lights positioned on the hubcap to which the battery pack is engaged.

16. A hubcap kit, as set forth in claim 11, wherein at least two lights are provided for each of said plurality of openings, each opening having at least two lights of different colors.

17. A hubcap kit, as set forth in claim 16, wherein only one light is illuminated in each opening at one time, the light being illuminated is determined by the speed of rotation of said hubcap.

18. A hubcap assembly comprising:
- a hubcap for installation onto a wheel, said hubcap having an exterior surface provided with a central recess provided with first and second grooves on opposite sides of the central recess, said hubcap being provided with a plurality of openings;
- a plurality of lights positioned under said plurality of openings, said plurality of lights being electrically connected to the first and second grooves; and
- a battery pack engagable with and removable from the central recess for supplying power to said plurality of lights, said battery pack comprises:
  - a housing provided with a first and second opening on opposite sides of said housing and first and second open cavities on a top surface thereof;
  - a battery secured inside of said housing;
  - first and second electrodes electrically connected to said battery, said first electrode extending through the first opening and said second electrode extending through the second opening, said first and second electrodes being biased so as to retractably extend from said housing and engage the first and second grooves, respectively, in the central recess in said hubcap to provide power to said plurality of lights;
  - a first handle slidably positioned in said first cavity, said first electrode extending through and cooperating with said first handle such that said first handle is biased toward an outside edge of said housing; and
  - a second handle slidably positioned in said second cavity, said second electrode extending through and cooperating with said second handle such that said second handle is biased toward an outside edge of said housing.

19. A lighted wheel comprising:
- an exterior surface provided with a central recess and a plurality of openings;
- a plurality of lights positioned under said plurality of openings;
- a battery pack engagable with and removable from the central recess for supplying power to said plurality of lights, said battery pack being removable from the exterior surface.

20. A kit, as set forth in claim 11, wherein the vehicle is an automobile.

* * * * *